United States Patent [19]

Stenger-Smith et al.

[11] Patent Number: 5,587,488

[45] Date of Patent: Dec. 24, 1996

[54] BIS-SULFONIUM SALTS OF AMINO SUBSTITUTED BIS(HALOMETHYL) BENZENE

[75] Inventors: John D. Stenger-Smith; William P. Norris; Andrew P. Chafin, all of Ridgecrest, Calif.

[73] Assignee: The United States of America as represented by the Secretary of the Navy, Washington, D.C.

[21] Appl. No.: 441,178

[22] Filed: May 10, 1995

Related U.S. Application Data

[62] Division of Ser. No. 252,701, May 31, 1994, abandoned.

[51] Int. Cl.$^6$ ................................. C07D 409/10
[52] U.S. Cl. ............................. 549/59; 528/380
[58] Field of Search ................... 549/59, 74, 78; 528/380, 101

[56] References Cited

U.S. PATENT DOCUMENTS

| | | | |
|---|---|---|---|
| 3,660,431 | 5/1972 | Hatch | 549/59 |
| 3,903,056 | 9/1975 | Schmidt et al. | 549/59 |
| 4,101,438 | 7/1978 | Frenier et al. | 549/59 |
| 5,171,632 | 12/1992 | Heeger et al. | 549/59 |
| 5,401,827 | 3/1995 | Holmes et al. | 528/374 |
| 5,473,047 | 12/1995 | Shi | 528/312 |

OTHER PUBLICATIONS

CA 117: 172232, Denton et al., "Para–xylylenes and Analogs by base–induced elimination . . . ", 1993.
CA 118: 169723, Jung Jin et al, "Synthesis and Characterization of Poly(2–methoxy–5–nitro–1, 4–phenylenevinylene", 1993.
CA 118: 201718, Holmes et al., "Semi conductive copolymers for use in luminescent devices", 1992.

*Primary Examiner*—José G. Dees
*Assistant Examiner*—Deborah Lambkin
*Attorney, Agent, or Firm*—Stephen J. Church; Melvin J. Sliwka; John L. Forrest, Jr.

[57] ABSTRACT

Novel bis-sulfonium salts of amino substituted bis(halomethyl)benzene are disclosed. The sulfonium salts are prepared by reaction of an amino substituted bis(halo methyl)benzene with an aliphatic sulfide. These sulfonium salts can be made into polymer having non-linear optical properties, and polymers which can be converted to electrically conductive polymers. Such polymers are produced by reacting a novel bis-cycloalkylene sulfonium salt of 2,5,N,N-tetramethylaniline hydrochloride, such as 2,5-(N,N-dimethyl)aniline hydrochloride dimethylene bis-(tetramethylene sulfonium chloride) with alkali metal hydroxide to form a cycloalkylene sulfonium salt precursor polymer, and then heating the precursor polymer under conditions to produce the amino substituted phenylene vinylene polymer, such as poly(2-(N,N-dimethylamino) phenylene vinylene).

4 Claims, No Drawings

BIS-SULFONIUM SALTS OF AMINO SUBSTITUTED BIS(HALOMETHYL) BENZENE

CROSS-REFERENCE TO RELATED APPLICATION

This application is a division of application Ser. No. 08/252,701 filed 31 May 1994, abandoned.

BACKGROUND OF THE INVENTION

This invention relates to the production of bis-sulfonium salts of amino substituted bis(halomethyl) benzene compounds which are precursors for polymers with electrical and/or third order non-linear optical (NLO) properties, and is particularly concerned with the preparation of novel bis-sulfonium salts of amino substituted bis(halomethyl)benzene as precursors for conjugated amino substituted phenylene vinylene polymers having the above characteristics.

Polymers with electrical properties can be used for electromagnetic shielding, electronic counter measures, electrical device fabrication, and optical switching. Polymers with third order NLO properties can be used in smart skins, eye protection and optical switching.

The U.S. Pat. Nos. 4,599,193, 4,626,588 and 4,528,118 give some information on the synthesis of sulfonium salt precursors of poly(para-phenylene vinylene), (PPV), and the synthesis of sulfonium salt precursors of substituted PPV's. However, they do not teach the incorporation of amino substituents into the the sulfonium salt precursors, nor do they claim sulfonium salts of amino substituted bis(halomethyl) benzene as part of their invention.

In the article "Synthesis and Electrical Conductivity of $AsF_5$-Doped Poly(Arylene Vinylenes)" by S. Antoun, et al., Polymer Bulletin, 15,181–184 (1986), a series of polymers containing 2,5- disubstituted phenylene vinylene units, and the polymer containing 1,4-naphthalene vinylene units, were prepared by polymerization of their bis(sulfonium salts) through a base elimination reaction in solution. Films of these polymers were cast from aqueous solution and chemically treated (doped) with $AsF_5$ vapor. The electrical conductivity of the doped films varied greatly with changes in polymer structure. The preparation of poly( 1,4-naphthalene-vinylene) is also disclosed in the article "Preparation and Electrical Conductivity of Poly(1,4 Naphthalene Vinylene)" by S. Antoun, et al., Journal of Polymer Science: Part C: Polymer Letters, Vol 24, 503–509, (1986). The preparation of dimethyl 2-(N,N-dimethylamino)terephthalate is described in H. Kauffmann, et al., Justus Liebig's Annalen der Chemie, 26, 393 ( 1912).

One object of the present invention is the provision of novel polymers having non-linear optical properties and/or electrical conductivity properties, and amino substituted bis(halomethyl)benzene precursors of such polymers.

Another object is to provide certain sulfonium salts of amino substituted bis(halomethyl)benzene compounds.

SUMMARY OF THE INVENTION

The above objects are achieved according to the invention by the provision of a class of sulfonium salts based on amino substituted benzene and characterized by the following general formula:

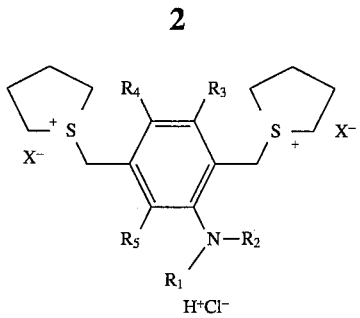

where the substituents R1 and R2 on the amine (and quarternized amine) group can be: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. The substituents R3, R4 and R5 can be: hydrogen; alkyl of from 1 to about 22 carbon atoms, such as methyl; alkoxy containing from 1 to about 22 carbon atoms, such as methoxy; nitro; halogen; amine (and quarternized amine) as described above; sulphonate groups; silyl; perfluoro alkyl, such as ($CF_3$); and cyano esters.

A preferred variety class of the bis-sulfonium salts of this invention is 2,5-(N,N-dimethyl)aniline hydrochloride dimethylene bis-(tetramethylene sulfonium chloride) having the structure shown below.

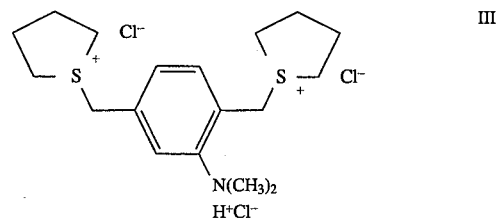

The above class of bis-sulfonium salts can be made into polymers and copolymers that can be formed by casting from a solvent solution, with the resulting films exhibiting strong, stable nonlinear optical properties. Such films become highly electrically conductive after a suitable doping treatment. Powders of the above polymers can be pressed into pellets.

DETAILED DESCRIPTION OF THE INVENTION AND PREFERRED EMBODIMENTS

The bis-sulfonium salts of the invention are prepared by making the bis-cycloalkylene sulfonium salt of amino substituted phenyl dimethylene having the following formula:

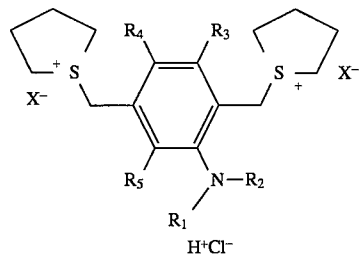

where: X is halogen; the substituents R1 and R2 on the amine (and quarternized amine) group can be: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. The substituents R3, R4 and R5 can be: hydrogen; alkyl of from 1 to about 22 carbon atoms, such as methyl; alkoxy containing from 1 to about 22 carbon atoms, such as methoxy; nitro; halogen; amine (and quaternized amine) as described above; sulphonate groups; silyl; perfluoro alkyl, such as (CF$_3$); and cyano esters, in the presence of alkali metal hydroxide at reduced temperature to form a cycloalkylene sulfonium salt precursor polymer. This is followed by evaporation of solvent and then heating of such precursor polymer under conditions to form the amino substituted phenylene vinylene polymer I above. Thus, poly(2-(N,N-dimethylamino) phenylene vinylene) can be prepared by the polymerization of the bis-sulfonium salt, 2,5-(N,N-dimethyl)aniline hydrochloride dimethylene bis-(tetramethylene sulfonium chloride) in solution in water, or other suitable solvent, in the presence of sodium hydroxide, at low temperature, such as 0° C., to form a cycloalkylene sulfonium salt precursor polymer, followed by heating of the precursor polymer at a temperature between about 150° C. and about 300° C., in vacuo, according to the following reaction scheme:

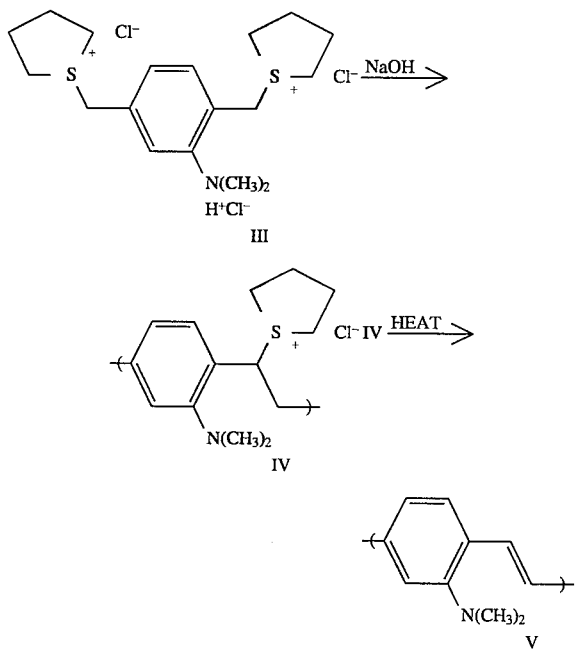

The bis-cycloalkylene sulfonium monomer salts (III) and the bis chloromethyl amines (IX) noted above are novel compounds which, such as in the case of the dimethylamino derivative compound III noted above, can be prepared by the following reaction scheme:

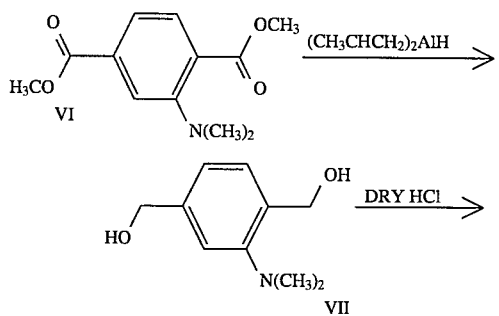

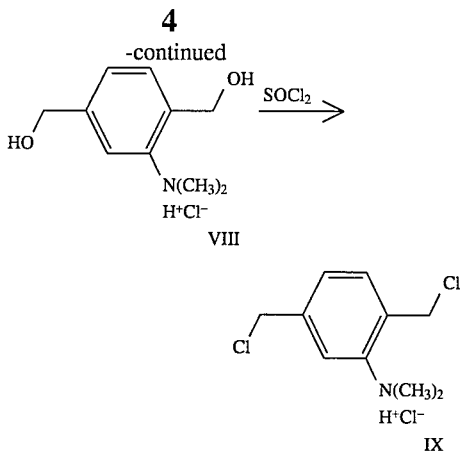

and then reacting the resulting chlorinated compound IX with a solution of tetrahydrothiophene in methyl alcohol, or other polar solvent, to form the bis-cycloalkylene sulfonium monomer salt III above. The corresponding bromide derivative of monomer salt III above can be prepared in the same manner as described above, substituting thionyl bromide for the thionyl chloride.

It is noted that one or more of various substituents R1 and R2 can be various types of hydrocarbons. Specific examples of such substituents include: hydrogen; alkyl from 1 to about 22 carbon atoms, such as methyl; alkyl sulfonate with alkyl from about 1 to 22 carbon atoms such as decyl sulfonate; alcohol from 1 to about 22 carbon atoms such as propanol. It is further noted that one or more of the other substituents R3, R4 and R5 can be: alkyl of from 1 to about 22 carbon atoms, such as methyl; alkoxy containing from 1 to about 22 carbon atoms, such as methoxy; nitro; halogen; amino as described above; sulphonate groups; silyl; perfluoro alkyl, such as (CF$_3$); and cyano esters. Thus, examples of specific polymers of the invention in addition to PDMAPV include poly(2,5-bis-(N,N-dimethylamino) phenylene vinylene), poly(2,3,5-tris-(N,N-dimethylamino) phenylene vinylene), poly(2,3,5,6-tetrakis-(N,N-dimethylamino) phenylene vinylene), poly(2-amino phenylene vinylene), poly(2-(N, methylamino)-5-(N-propyl-N-butylmamino) phenylene vinylene), poly(2-(N,N-dimethylamino)-5-nitro phenylene vinylene), poly(2-(N,N-dimethylamino )5-cyano-6-methoxy phenylene vinylene) poly(2-(N-hydoxymethl,N-methylamino)-3-hexyl-5-octadecyl-6-perfluorpentyl phenylene vinylene) etc.

The following are examples of practice of the invention.

EXAMPLE 1

Preparation of 2,5-bis(hydroxymethyl)-N,N-dimethylaniline hydrochloride VIII

Into a 500 ml Round bottom flask, 10 grams (0.0421 mol) of dimethyl 2-(N,N-dimethylamino)terephthalate (VI) (see Kauffmann et. al) and 100 ml of toluene were added. To this solution, 120 ml of 1.5 molar diisobutylaluminum hydride (DIBAL-H) were added with cooling and stirring; the reaction temperature was kept below 40° C. Completion of the reaction, that is addition of sufficient DIBAL-H, is evidenced by the disappearance of the yellow color of the original solution. After addition of sufficient DIBAL-H, the reaction temperature was kept at 40° C. for about 5 minutes. After this the flask was cooled to 0° C. and 400 ml of methanol was added carefully. The addition of the first few ml of methanol is accompanied by vigorous gas evolution due to the slight excess of DIBAL-H. The stirred mixture was then heated to reflux for 15 minutes, then cooled and filtered. The residue was washed with 200 ml of methanol, and the residue was discarded. The volatiles of the filtrate were removed with the rotary evaporator. The oily residue (compound VII) was dissolved in 150 ml ether. This solution was treated with hydrogen chloride gas with stirring and recrystallized from acetonitrile to give 2,5-bis(hydroxymethyl)-N,N-dimethylaniline hydrochloride (VIII). Yield (before recrystallization) 92.1%. M.P. 121°–122° C. Elemental analysis: calcd for $C_{10}H_{16}ClNO_2$:C, 55.38; H, 7.41: Cl, 16.29,; N, 6.43. Found: C, 55.52; H, 7.52; Cl, 16.36; N, 6.67.

Preparation of 2,5-bis-chloromethyl-(N,N-dimethyl)aniline hydrochloride, IX

Thionyl chloride (35 ml) was added to 2 grams (0.00919 mol) of 2,5-bis(hydroxymethyl)-N,N-dimethylaniline hydrochloride, VIII. The 2,5-bis(hydroxymethyl)-N,N-dimethylaniline hydrochloride (VIII) went into solution immediately, accompanied by evolution of heat and gas. The reaction was stirred for several minutes. The volatiles were removed under reduced pressure to yield 2.38 g of crystalline residue, compound IX. The solid IX was dissolved in a minimum amount of hot acetonitrile; the solution was filtered, and an equivalent amount of ethyl acetate added and the solution cooled. Yield 77%. Elemental analysis: calcd for $C_{10}H_{14}Cl_3N$: C, 47.18; H, 5.54: Cl, 41.78,; N, 5.50. Found: C,47.04; H, 5.54; N, 5.34

Preparation of 2,5-(N,N-dimethyl)aniline hydrochloride dimethylene bis-(tetramethylene sulfonium chloride), III.

Into a 50-ml flask equipped with a magnetic stirrer were placed 1.75 g (0.007 mol) of 2,5-bis-chloromethyl-(N,N-dimethyl)aniline hydrochloride (IX), 3.0 g (0.032 mol) of tetrahydrothiophene, and 15 ml of methanol. The mixture was stirred and heated to 40° C. for about 5 hours. The resulting solution was cooled and precipitated into acetone, yielding a very hygroscopic resinous material. This material (III) (approximately 3 grams) was dissolved in 8 ml of water and used for the next step.

EXAMPLE 2

Preparation of Precursor Polymer IV

Both solutions used in the following polymerization step were deoxygenated with $N_2$ at room temperature for two (2) hours. To 8 ml of a 0.87M (approx) aqueous solution of the sulfonium salt monomer (III), (0.007 mol approx) was added all at once under nitrogen 10 ml of 1.44M aqueous solution of NaOH (0.014 mol) (the extra base is added to convert the amine hydrochloride groups of the monomer to amine groups). The contents of the flask turned orange-yellow and slightly cloudy after about 5 minutes. After 35 minutes the pH of the water in the flask was about 12, indicating that the amine hydrochloride groups were converted. The water was neutralized to pH 5 with about 8 ml of dilute acid, and the mixture turned pale yellow and became less cloudy. This mixture was dialysed for about 4 days against slightly basic water. The resulting solution of (with a small amount of precipitate) was filtered, giving a clear solution of IV that fluoresced green upon excitation with UV light.

EXAMPLE 3

Film Casting

Five (5) ml of the precursor polymer (IV) solution of Example 1 were placed on a treated glass substrate (the glass was treated with dichlorodimethyl silane to facilitate removal of the polymer film) and allowed to evaporate. The resulting film could be easily removed from the substrate and an Infrared Spectrum of the fresh film was taken. The fresh film was then heated in vacuo at 250° C. for twelve (12) hours for conversion of the precursor polymer (IV) to product polymer (V). The heat treatment procedure was repeated for several different temperatures (such as 170°, 260° and 300° C.).

EXAMPLE 4

A free standing film made from the undiluted solution was converted to the final polymer (V) by the methods described above (such as Example 2) and then treated with fuming sulfuric acid in a vacuum atmosphere. A color change from greenish yellow to black was observed, indicating protonic doping of the polymer to its conductive form.

From the foregoing, it is seen that the invention provides for the preparation of a novel class of amino substituted phenylene vinylene polymers, including certain amino substituted phenylene monomers employed in preparing such polymers, such polymers having non-linear optical properties and also exhibiting electrical conductivity upon electrochemical or chemical oxidation doping. Various uses of such polymers are noted above.

Since various changes and modifications can be made in the invention without departing from the spirit of the invention, the invention is not to be taken as limited except by the scope of the appended claims.

What is now claimed:

1. The bis-sulfonium salts of amino substituted bis(halomethyl) benzene compounds having the formula:

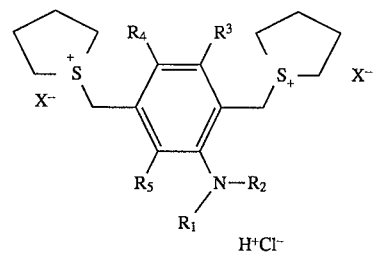

wherein X is halogen; wherein $R_1$ and $R_2$ on the amine and quaternized amine group are each independently hydrogen; alkyl having 1 to about 22 carbon atoms; alkyl sulfonate having 1 to about 22 carbon atoms; or alcohol having 1 to about 22 carbon atoms, wherein $R_3$, $R_4$, and $R_5$ are each independently hydrogen; alkyl having 1 to about 22 carbon atoms; alkoxy having 1 to about 22 carbon atoms; nitro; halogen; amine; sulphonate; silyl; perfluoro alkyl; or cyano esters.

2. The bis-sulfonium salt of 2,5,N,N-dimethylaniline hydrochloride having the formula:

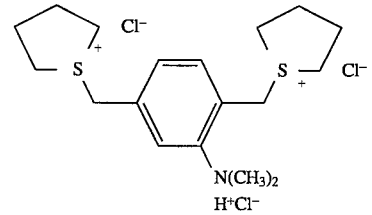

3. The bis-sulfonium salts of amino substituted bishalomethyl benzene compounds of claim 1 wherein $R_1$ and $R_2$ are each independently chosen from the group consisting of methyl, decyl sulfonate, and propanol.

4. The bis-sulfonium salts of amino substituted bishalomethyl benzene compounds of claim 1 wherein $R_3$, $R_4$, and $R_5$ are each independently chosen from the group consisting of hydrogen, methyl, methoxy, and trifluoromethyl.

* * * * *